United States Patent Office 2,873,840
Patented Feb. 17, 1959

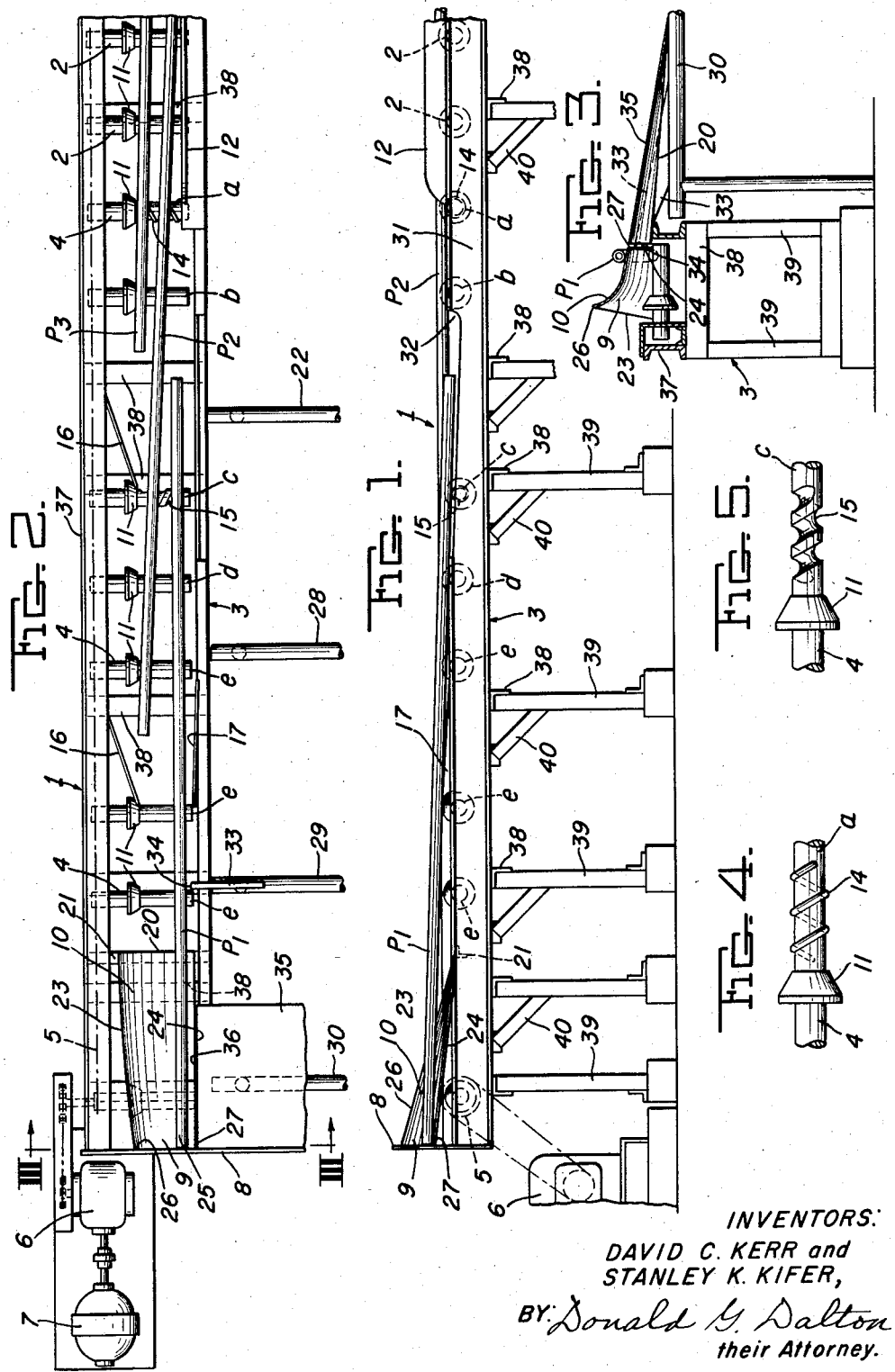

2,873,840

APPARATUS FOR HANDLING PIPE OR THE LIKE

David C. Kerr and Stanley K. Kifer, Lorain, Ohio, assignors to United States Steel Corporation, a corporation of New Jersey Application October 21, 1954, Serial No. 463,768

12 Claims. (Cl. 198—28)

This invention relates to an apparatus for handling elongated articles such as pipe and the like and, more particularly, is directed to a mechanism for removing such articles laterally from a conveyor over which they travel in an endwise direction.

More specifically, the apparatus of this invention is directed to an apparatus for removing pipe laterally from a conveyor by which it is delivered from a galvanizing station to an inspection or other type of station. In pipe galvanizing apparatus, the pipe is moved through a spelter bath and delivered in an endwise or axial direction to a roller conveyor over which its endwise movement is continued. At the end of the conveyor, endwise movement of the pipe is discontinued and the pipe is moved laterally to an inspection or shipping station, an operation which is rendered more difficult when the ends of adjacent pipes overlap. Delivery of pipe with ends of adjacent pipes overlapping renders most conventional lateral transfer mechanisms ineffective since their operation to remove a pipe delivered to the transfer station will result in premature lateral movement of a following pipe.

One of the objects of this invention is to provide an improved mechanism for removing pipe laterally from the end of a roller conveyor over which it is moving in an endwise direction.

A further object of the invention is to provide a removal mechanism of the character referred to which will effect lateral movement of a pipe delivered by a roller conveyor to a removal station without interfering with the movement of additional pipe to the removal station.

Another object of the invention is to provide an apparatus for removing pipe laterally from a conveyor over which it is delivered in an endwise direction with the ends of adjacent sections overlapping with a mechanism effective to remove a section only upon its movement to a predetermined position relative to the removal station and without interfering with the movement to such removal station of an adjacent and overlapping section.

The above and related objects of the invention are effected by a conveyor apparatus having provisions at its end for stopping endwise movement of the pipe and for tilting it about a transverse axis to elevate its forward end and to lower its trailing end. This is accomplished by a skid plate which engages the forward end of the pipe and tilts it about one of the conveyor rolls as a fulcrum to lower its trailing end below the level of the conveyor rolls. In this manner, the trailing end of the pipe is lowered into engagement with an ejecting roll which moves it laterally from the conveyor onto a runout apparatus. In a manner to be described, the skid plate which stops and tilts the pipe has an angular inclination for starting the movement of the front end of the pipe laterally from the conveyor before the ejector roll engages its trailing end. Also in a manner to be described, removal of each section of pipe is effected severally without interfering with the movement of following sections to the removal station and in such manner that the delivery of pipe with ends overlapping is accomplished without disturbing the operation of the removal mechanism.

Other objects and advantages of the invention will be apparent from the following description.

In the drawings, there is shown a preferred embodiment of the invention. In this showing:

Figure 1 is a side elevational view of a pipe handling and conveyor mechanism constructed in accordance with the principles of this invention;

Figure 2 is a plan view of the apparatus shown in Figure 1 together with a fragmentary plan view of a runout apparatus for receiving the pipe from the conveyor;

Figure 3 is an end elevation looking in the direction of the line III—III of Figure 2; and Figures 4 and 5 respectively are fragmentary elevational views of rollers used in the apparatus shown in the preceding figures.

In the drawings, the numeral 1 designates as a whole the pipe handling apparatus of this invention which may conveniently form the end portion of a conventional roller conveyor, the last rollers of which are designated by the numerals 2 at the right of Figures 1 and 2, for delivering pipe from a galvanizing apparatus. The handling apparatus 1 includes a narrow supporting frame 3 mounting a plurality of transversely extending rollers 4 as well as the rollers 2. The rollers 4 and 2 are driven by a chain and sprocket drive 5 from a transmission 6 and a drive motor 7. The drive 5 and the mountings of the rollers 4 and 2 transversely of their supporting frame are conventional and have not been shown in the drawings.

The rolls 2 and 4 deliver the pipe in an endwise direction to a vertical stop plate 8 which stops the forward movement of the pipe and is secured to the forward end 9 of a skid plate 10, sections of pipe being designated at p1, p2 and p3. Each of the rolls 2 and 4 has a guide flange 11 for guiding the forward movement of the pipe sections relative thereto. The forward movement of the pipe over the rollers 2 is confined between the roller flanges 11 and a stationary guide flange 12 extending along one edge of the supporting frame.

As the forward end of each pipe leaves the last conventional roller 2, it engages the first roller a of the rollers 4. The roller a (see Figure 4) has a spiral ridge 14 along its surface which is effective to move the pipe inwardly toward its guide flange 11. The surface of the second roller b is smooth and is effective only for the purpose of continuing forward movement of the pipe. The second roller b is spaced from the stop plate 8 a distance slightly greater than the length of the pipe for a purpose to be described. The third roller c has a spiral groove 15 in its surface and is positioned slightly below the level of the remaining rollers 4 so that it does not normally engage with the pipe during forward movement to the skid plate 10 and stop plate 8. The next roller d constitutes a fulcrum about which the pipe is tilted by the skid plate 8 in a manner to be described to lower its trailing end into operative engagement with the groove 15. The spacing of the rollers b and c relative to each other and to the stop plate 8 is such that the trailing end of a pipe having its forward end against the stop plate 8 will drop downwardly into engagement with the ejecting roller c without interference from the roller b. The remaining rollers e are drive rolls for continuing the forward movement of the pipe to the skid plate 10 and stop plate 8. At spaced intervals along the length of the frame 3, guide plates 16 are provided for engagement with the forward ends of the pipe to prevent angling movement of the pipe to positions with their forward ends in back of the roller guide flanges 11. A guide plate 17 is also provided for a purpose similar to that of the plate 12.

The skid plate 10 has an upward slope from its inner end 20 to the outer end 9 thereof which is secured to the stop plate 8 as by welding along a line below its upper edge, the inner end 20 being secured to an angle 21 extending transversely of the frame 3. By reason of the upward slope of the skid plate 10, a pipe moving toward the stop plate 8 will have its forward end elevated as it slides forwardly over the surface of the skid plate 10. Elevation of the forward end of the pipe section in this manner will cause it to tilt about the roll *d* as a fulcrum to lower its trailing end into engagement with the roll *c* and into the spiral groove 15. As the trailing end of the pipe moves into the groove 15, it will be moved laterally outwardly and rolled onto a supporting rail 22 of a run-out table.

The skid plate 10, in addition to having an upward slope from its rear end 20 to its front end 9, has a downward slope from one of its side edges 23 to the other side edge 24. By reason of the downward slope of the edge 23 toward the edge 24, the forward end of a pipe will gravitate with a rolling movement toward the edge 24 as it slides toward the stop plate 8. This results in the forward end 25 of each pipe moving toward the side edge 24 prior to engagement of its trailing end in the ejector groove 15 on the roll *c*. Rolling movement of the end 25 down the skid plate 10 in this manner prior to engagement of the pipe in the ejector groove 15 is desirable so that the ejecting movement of the roll *c* will not cause the pipe to rotate in a clockwise direction as viewed in Figure 2 and thus tend to prevent the end 25 from rolling laterally off the skid plate 10.

The skid plate 10 may have any convenient shape as long as its front end 9 is positioned at a higher elevation than its rear end 20, and with the rear point 26 of its front end 9 at a higher elevation than the point 27. A structure meeting these requirements of the skid plate 10 may be fabricated, for example, by cutting a spiral section having a length of about five feet and a width of about one foot from a 20″ pipe, the spiral taper of the section being such that the points 26 and 27 of the front end 9 are displaced about 90° from the edge points of the rear end 20. The rear end 20 of course is flattened out when it is secured to the anchor 21 but its front end 9 will have a curvature as viewed in Figure 3, this curvature being particularly effective for rolling the front end of pipe sections to the position shown in Figures 2 and 3.

The skid plate 10 and ejector roller *c* operate to move the pipe laterally and cause its removal from the apparatus 1. As each pipe moves laterally off the apparatus 1, it moves onto a run-out structure which is comprised of the run-out rail 22 mentioned above and similar rails 28, 29 and 30. As shown in Figure 2, the side member 31 of the frame 3 has a portion removed at 32 so that the lowered trailing end of the pipe may be moved laterally onto the rail 22 by the ejector roller *c*. The run-out rail 29 has a control guide 33 sloping upwardly toward the conveyor portion of the apparatus, the front end 34 of which acts as a stop to prevent premature rolling movement of the pipe onto the rail 29. When the front end of the pipe moves into engagement with the stop 8, it will be elevated to a position clearing the upper edge of the stop 34 so that it may roll downwardly onto the supporting rail 29. The inner edge of the run-out rail 30 has a run-out plate 35 mounted thereon, the inner edge 36 of which extends along the inner edge 24 of the skid plate 10 and in effect provides an extension of the downwardly sloping surface of the skid plate 10 over which the pipe may roll onto the supporting rail 30.

Having mentioned that the frame 1 includes a side member 31 which is in the form of a channel section, it may be noted that the frame has at its other side a similar channel section 37. Connecting angles 38 extend between the side sections 31 and 37 and are supported on the upper ends of posts 39, the posts being braced by braces 40.

In operation, rotation of the drive rollers 2 of a conventional conveyor delivers sections of pipe in an endwise direction to the apparatus 1 of this invention. As each pipe section moves to a position corresponding to that occupied by the section *p*3 with its forward end positioned over the rollers 4*a* and 4*b*, the spiral ridge 14 on the roller 4*a* engages and moves its forward end inwardly against the guide flanges 11. Continued forward movement of the pipe section results in its movement to the position occupied by the pipe section *p*2 with its forward end engaged by the rollers 4*d* and 4*e*. In this position, the pipe is not engaged with the roller 4*c* which has its axis positioned a slight distance below the axis of the remaining rolls 4, this distance being a fraction of an inch and just sufficient to clear bent sections of pipe which may be moving thereover. When the pipe moves to a position with its forward end over the inner edge 20 of the skid plate 10, its forward end 25 is elevated as it moves over the skid plate 10 to the stop plate 8, and during this elevating movement the pipe will tend to roll and slide down the surface of the skid plate toward its edge 24 and onto the run-out plate 35. As explained above, the skid plate 10 is effective during movement of a pipe section to a position corresponding to that occupied by the section *p*1 to tilt the pipe about the roller *d* and to lower its trailing end into operative engagement with the roller *c* and the groove 15 therein. In order that the trailing end of the section may drop into the groove 15, the roller *b* is spaced from the stop plate 8 a distance greater than the length of the pipe handled by the apparatus. Referring to Figure 2 and with particular reference to the showing of the position of the pipe *p*1, it will be noted that its trailing end is spaced from the roller 4*b* a distance less than the length of the skid plate 10. With a spacing of this nature, initial tilting action of the pipe as it moves up the skid plate 10 takes place about the roller 4*b*. However, as soon as the trailing end of the pipe clears the roller 4*b*, it will drop into engagement with the surface of the roller 4*d*, and if this movement is insufficient to drop the trailing end into the groove 15, final tilting movement of the pipe about the roller 4*d* as it moves to the stop plate 8 will have this effect. Actually, the pipe may be engaged with the roller 4*d* at all times in view of the sag which takes place as initial movement up the slope of the skid plate 10 tends to effect rotation of the pipe about the roller 4*b*.

While one embodiment of our invention has been shown and described it will be apparent that other adaptations and modifications may be made without departing from the scope of the following claims.

We claim:

1. An apparatus for handling elongated articles comprising a conveyor over which the articles are conveyed in an endwise direction, means engageable with the forward end of each article as it moves to the end of said conveyor for tilting it to a position with its said forward end elevated and its trailing end lowered relative to said conveyor, and means responsive to movement of each article to said tilted position for engaging its trailing end and for moving it laterally with respect to said conveyor, said tilting means including means for effecting lateral movement of said forward end relative to said conveyor upon movement to its elevated position.

2. An apparatus for handling elongated articles comprising a conveyor over which the articles are conveyed in an endwise direction, a skid plate having a surface sloping upwardly toward the end of the conveyor and engageable with the forward end of each article as it moves to the end of said conveyor for tilting it to a position with its forward end elevated and its trailing end lowered relative to said conveyor, and means spaced rearwardly of said skid plate a distance less than the length of said articles and engageable with said trailing end when tilted to said lowered position for moving the article laterally with respect to said conveyor, said skid plate surface being inclined downwardly in a direction laterally of said conveyor and down which the forward end of the article may gravitate.

3. An apparatus for handling elongated articles comprising a conveyor having a plurality of transversely extending rollers for conveying said articles in an endwise direction thereover, a skid plate in the path of movement of the articles over said conveyor and having an upwardly sloping surface with which the forward end of each article engages and by which it is tilted about one of said rollers as a fulcrum to a position with its forward end elevated and its trailing end lowered relative to said conveyor, and means responsive to movement of each article to said tilted position for engaging and shifting the trailing end thereof laterally with respect to said conveyor.

4. An apparatus for handling elongated articles comprising a conveyor having a plurality of transversely extending rollers for conveying said articles in an endwise direction thereover, a skid plate in the path of movement of the articles over said conveyor and having an upwardly sloping surface with which the forward end of each article engages and by which it is tilted about one of said rollers as a fulcrum to a position with its forward end elevated and its trailing end lowered relative to said conveyor, and means responsive to movement of each article to said tilted position for engaging and shifting the trailing end thereof laterally with respect to said conveyor, said skid plate further having an inclination downwardly in a direction laterally of the conveyor so that the forward end of an article moving over said surface will gravitate toward the side of the conveyor.

5. An apparatus for handling elongated articles comprising a conveyor having a plurality of transversely extending rollers for conveying said articles in an endwise direction thereover, a skid plate in the path of movement of the articles over said conveyor and having an upwardly sloping surface with which the forward end of each article engages and by which it is tilted to a position with its forward end elevated and its trailing end lowered relative to said conveyor, and a shifting roller spaced rearwardly from said skid plate a distance less than the length of said articles and having a spirally extending groove in which the trailing end of the article is received in response to movement of the article to said tilted position.

6. An apparatus for handling elongated articles comprising a conveyor having a plurality of transversely extending rollers for conveying said articles in an endwise direction thereover, a skid plate having a surface in the path of movement of the articles by said rollers, said surface having an upward slope in the direction of endwise movement of the articles and a downward slope in a direction laterally of the conveyor, and a shifting roller spaced rearwardly from said skid plate a distance less than the length of said articles for shifting the trailing end of each article in said lateral direction.

7. An apparatus as defined in claim 6 characterized by said shifting roller having a spirally extending groove for receiving the trailing end of each article and imparting said lateral shifting movement thereto.

8. An apparatus as defined in claim 6 characterized by one of said conveying rollers having a spirally extending ridge thereon for engaging and shifting the forward end of each article moving over said conveyor in an opposite lateral direction.

9. An apparatus for handling elongated articles comprising a conveyor having a plurality of transversely extending rollers for conveying said articles in an endwise direction thereover, a stop plate at the end of said conveyor for stopping the endwise movement of said articles, a skid plate arranged forwardly of said stop plate and having a surface sloping upwardly toward the end of said conveyor for tilting each article about one of said rollers as a fulcrum to a position with its forward end elevated and its trailing end lowered relative to said conveyor, and means spaced rearwardly of said stop plate a distance less than the length of said articles for engaging said trailing end when tilted to said lowered position and for moving the article laterally with respect to said conveyor, said skid plate surface being inclined downwardly in a direction laterally of said conveyor and down which the forward end of the article may gravitate.

10. An apparatus for handling elongated articles comprising a conveyor having a plurality of transversely extending rollers for conveying said articles in an endwise direction thereover, means in advance of the movement of each article to the end of said conveyor for moving it laterally in one direction with respect thereto, means at the end of said conveyor for stopping the endwise movement of each article and for tilting it about one of said rollers as a fulcrum to an inclined position, and means having engagement with opposite ends of said article in response to its movement to said inclined position for moving it in an opposite lateral direction to remove it from said conveyor.

11. An apparatus for handling elongated articles comprising a conveyor having a plurality of transversely extending rollers for conveying said articles in an endwise direction thereover, one of said rollers at a point in advance of the movement of each article to the end of said conveyor having a spirally extending ridge thereon for engaging and moving each article in one lateral direction with respect to said conveyor, a skid plate at the end of said conveyor having a surface in the path of movement of the articles by said rollers, said surface having an upward slope in the direction of endwise movement of the articles and a downward slope in an opposite lateral direction with respect to said conveyor, and a shifting roller spaced rearwardly from said skid plate a distance less than the length of said articles and positioned below the level of said conveyor rollers for moving the trailing end of each article in said opposite lateral direction.

12. An apparatus as defined in claim 10 characterized by said article stopping and tilting means comprising a skid plate with a surface sloping upwardly in the direction of endwise movement of the articles by said conveyor, and by said article removing means including a lateral extension on said skid plate with a downward slope in said opposite lateral direction over which the forward end of said article may roll and be discharged from the conveyor.

References Cited in the file of this patent

UNITED STATES PATENTS

| | | |
|---|---|---|
| 771,089 | Prescott | Sept. 27, 1904 |
| 921,165 | Ross | May 11, 1909 |
| 1,777,048 | Molins | Sept. 30, 1930 |
| 2,326,843 | Ely | Aug. 17, 1943 |